Sept. 1, 1959 C. L. TODD 2,901,855
FISHING DEVICE
Filed Dec. 14, 1955

Charlie L. Todd
INVENTOR.

United States Patent Office 2,901,855
Patented Sept. 1, 1959

2,901,855

FISHING DEVICE

Charlie L. Todd, Memphis, Tenn.

Application December 14, 1955, Serial No. 553,046

1 Claim. (Cl. 43—17)

This invention relates to fishing devices and particularly to a signaling device which gives a visual indication to the fisherman when a fish takes the hook on the line in his mouth.

An object of the present invention is to provide a signal device for fishermen's use, the device being such that it is capable of being the support for a still fishing line or capable of being connected in a trot line as a float therefor, the fishing device including a buoyant body on which a source of electrical energy, as a dry cell battery, is supported, the latter having an electric lamp brought into operative contact therewith in response to the pulling force applied to the fishing line, as would be caused by a fish biting the hook on the line.

The general purposes of the invention is to provide a device for modernizing the old type of jug fishing, trot line fishing, still fishing or other kinds of float fishing.

A further object of the invention is to provide an inexpensive, yet practical device for the above purpose, the device having an inflatable tube as the body for easy transportation, the tube being preferably toroidal in shape and provided with a support in the central opening thereof, this platform accommodating the dry cell battery and other parts which coact to form the signal device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
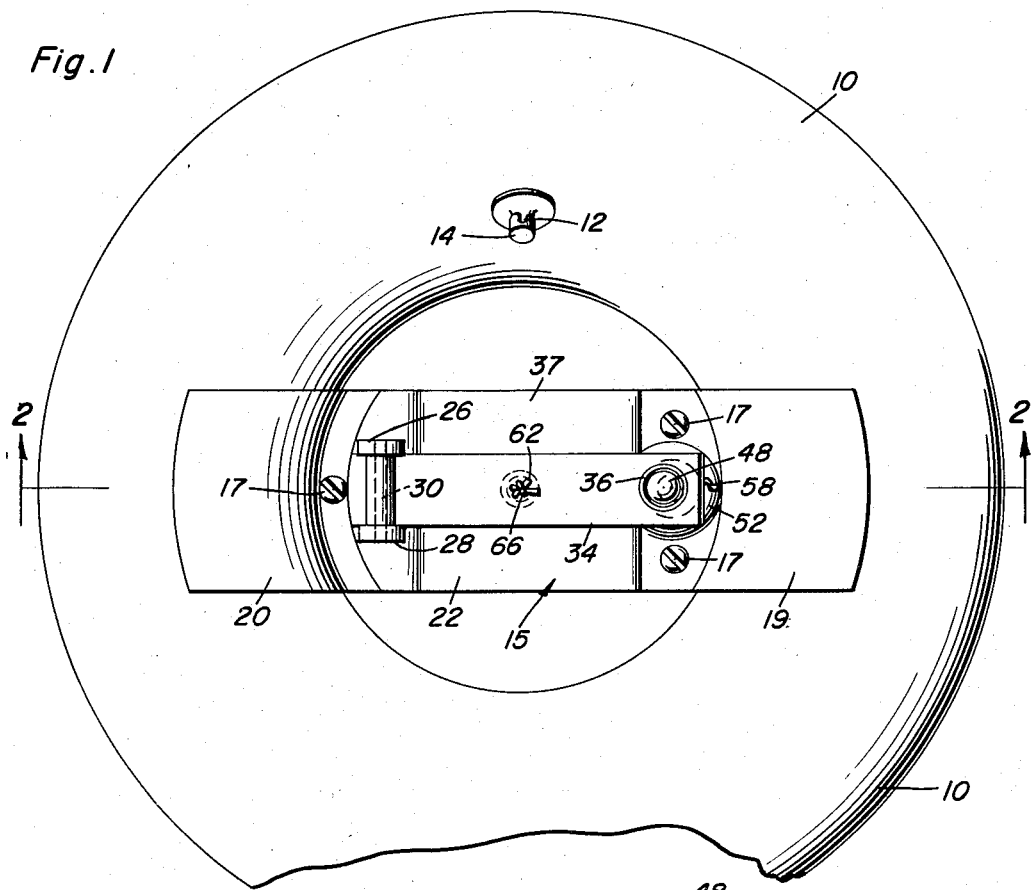
Figure 1 is a top view of the device.

A buoyant body is provided as the means for floating the signal device, this buoyant body comprising an inflatable cell or group thereof, for example, toroidal tube 10 of rubber or plastic. Means for conducting air into the tube 10 are attached to it, and the preferred means consist of a stem 12 having a removable cap 14. A valve is accommodated in the stem 12. Other valve assemblies such as a flap valve built in one wall of the toroidal tube 10 may be used in place of the stem 12.

A support 15 is disposed within the opening circumscribed by the tube 10 and is preferably made of two panels which are bolted as at 17 or otherwise joined in juxtaposition. The panels, when joined together, have substantially semi-cylindrical ends that form pockets 19 and 20 in which to accommodate opposite walls of the tube 10. It is preferred, although not essential that the support 15 be made of plastic material.

The upper panel 22 has a raised portion 24 in the center thereof, this raised portion being provided with a pair of ears 26 and 28. The ears accommodate a pivot pin 30 on which hinge butt 32 is mounted. This hinge butt is at one end of a pivoted beam 34, the opposite end having an aperture in which there is a socket 36.

Raised portion 24 of the upper panel 22 has a pair of side walls, a top wall 37, a rear and front wall. A small housing 40 is provided in the top wall 37 and defines a well 42 in which the lower end of spring 44 is mounted. The upper end of the spring is located in a pocket 46 formed on the underside of beam 34. Spring 44 holds the beam 34 normally spaced from the battery 16 a distance sufficient to have the lamp 48 in socket 36 spaced from the center pole of the battery.

Battery 16 is disposed in a battery holder 50. This holder consists of a pocket 52 which is made in the plastic upper panel adjacent to one wall of the raised portion 24. Battery holder 54 comprising a conductive cup or clip is located in pocket 52 and functions as a circuit element in that it is adapted to come in contact with the battery casing. Wire 58 is soldered or otherwise adhered to the conductive battery holder cup and is similarly secured to the socket 36. This establishes continuity between the battery 16 and the lamp socket 36. When the beam 34 is brought downwardly so that the center contact of the lamp 48 touches the center pole of battery 16, a circuit including the battery 16 is completed thereby energizing the lamp 48.

Figure 2:
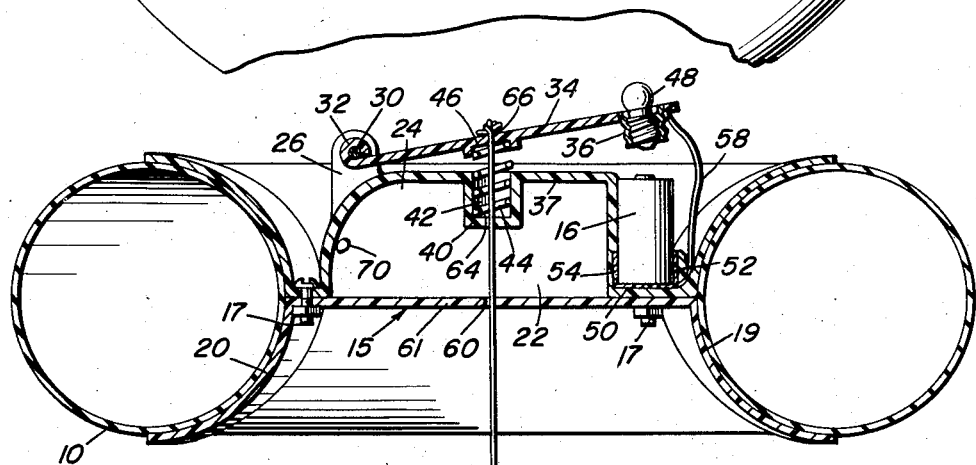
Figure 2 is a transverse sectional view taken on the plane of the line 2—2 of Figure 1.

An aperture 60 is formed in the panel 61 of support 15 in order to accommodate a fishing line 62. This line also passes through an aperture 64 in the bottom of housing 40 and through an aperture 66 in beam 34. The fishing line is knotted or otherwise secured to the beam 34. In use, for example, in float fishing, the line is attached to the beam as shown in Figure 2, that is, after passing through apertures 60 and 64. When a fish is hooked the weight of the fish pulls the beam 34 downwardly against the yielding opposition of spring 44. The lamp 48 is brought down against the center pole of the battery 16 and the electrical circuit including the battery 16 and lamp 48 is completed. In this way the lamp is energized thereby providing a signal to the fisherman. In order to enhance the visual properties of the signal that is delivered, the tube 10 and/or the support 15 is covered with a layer of luminous paint. In lieu of paint, other luminous sheet-like material, for example, paper bearing a film of luminous material may be used.

In the support 15 provision is made for attachment of a trot line. The simplest means are apertures 70 formed in the opposing side walls of raised portion 24. The trot line may be threaded through these apertures and tied in place. In addition, other types of float fishing may be practiced with the device. For example, the device may be used for jug fishing and other uses which may occur to skilled or unskilled fishermen.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restorted to, falling within the scope of the invention as claimed.

What is claimed as new is as follows:

A fisherman's device comprising an endless inflatable tube, enclosing an opening a support secured within said opening of said tube, a battery holder, a movable beam having a light socket carried thereby, means mounting said beam over said battery holder for movement toward and away from said holder, means in said beam between its ends to which a fish line is attachable so that upon pulling of the fish line said beam is moved in order to bring the socket toward the battery holder, yielding means holding said beam in such a position that said socket is spaced from said battery holder, said support having a well formed therein said yielding means comprising a coil spring having one end seated in said well and the opposite end reacting on said movable beam, said support and said well each having an aperture formed therethrough, and said line extending through said apertures and through said coil spring.

References Cited in the file of this patent

UNITED STATES PATENTS

| | | |
|---|---|---|
| 989,145 | Hatchett | Apr. 11, 1911 |
| 2,124,062 | Grant et al. | July 19, 1938 |
| 2,193,404 | Goertzen | Mar. 12, 1940 |
| 2,547,308 | Dean | Apr. 3, 1951 |
| 2,654,972 | Hollingsworth | Oct. 13, 1953 |
| 2,722,763 | Miner et al. | Nov. 8, 1955 |